No. 635,260. Patented Oct. 17, 1899.
E. LARSEN.
APPARATUS FOR DRY DISTILLATION OF WOOD, COAL, &c.
(Application filed Jan. 19, 1899.)
(No Model.) 3 Sheets—Sheet 1.
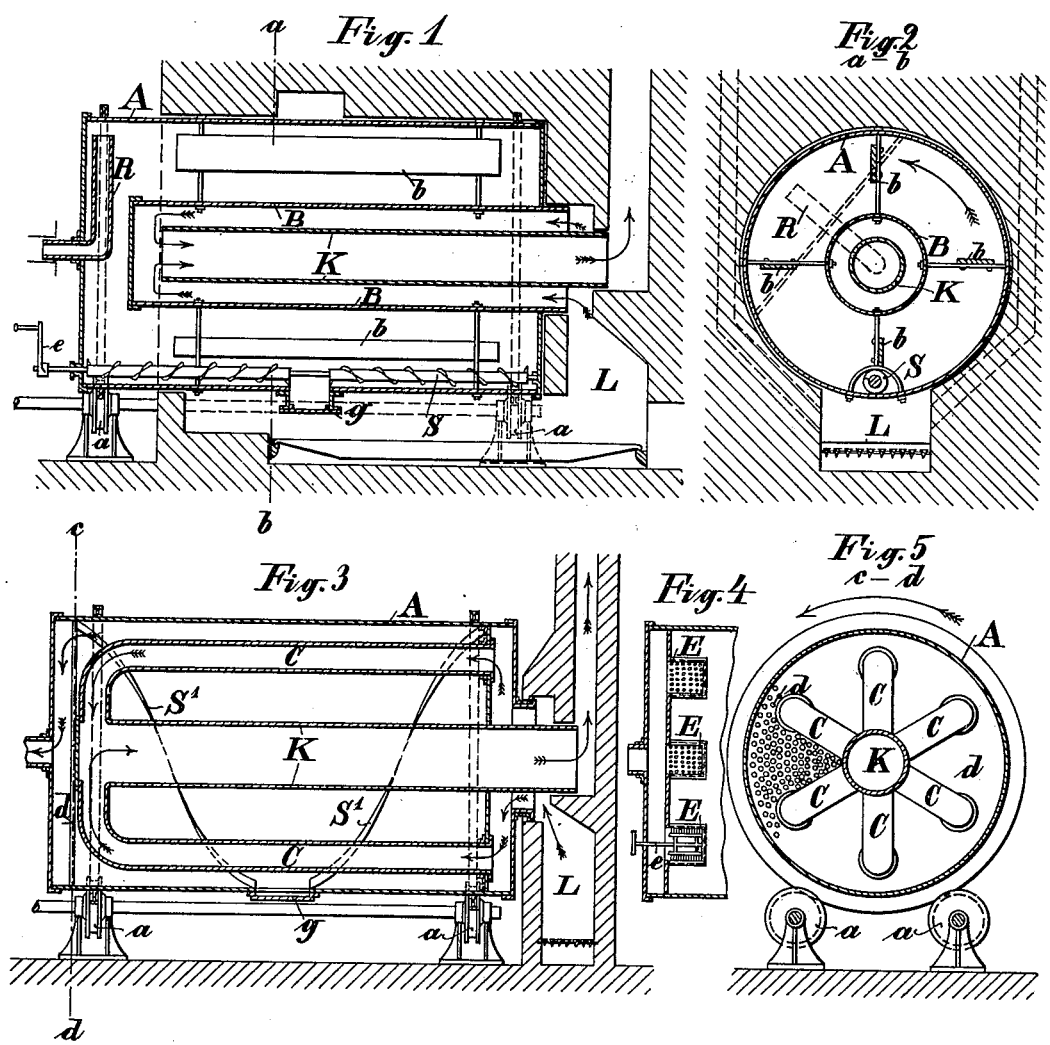

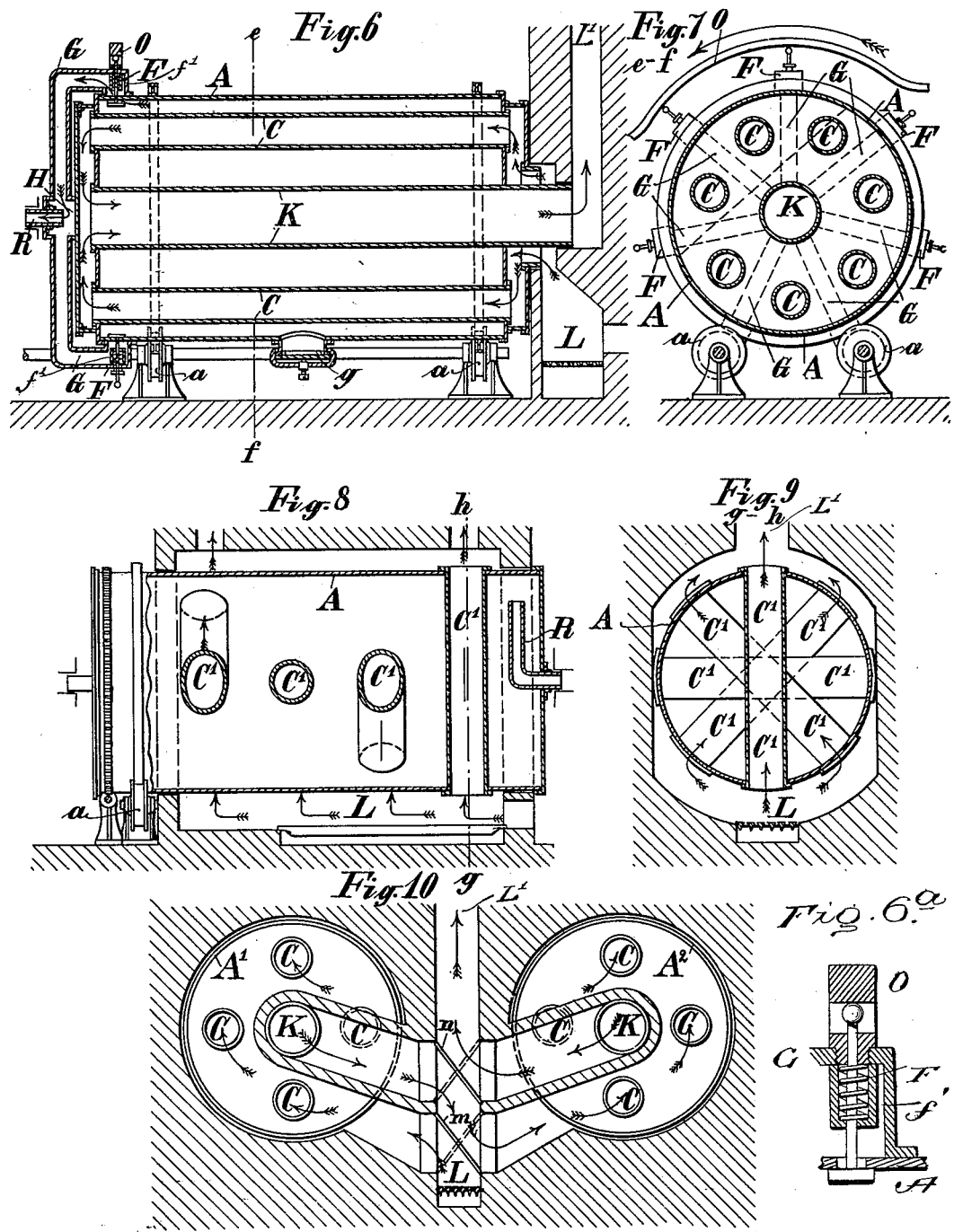

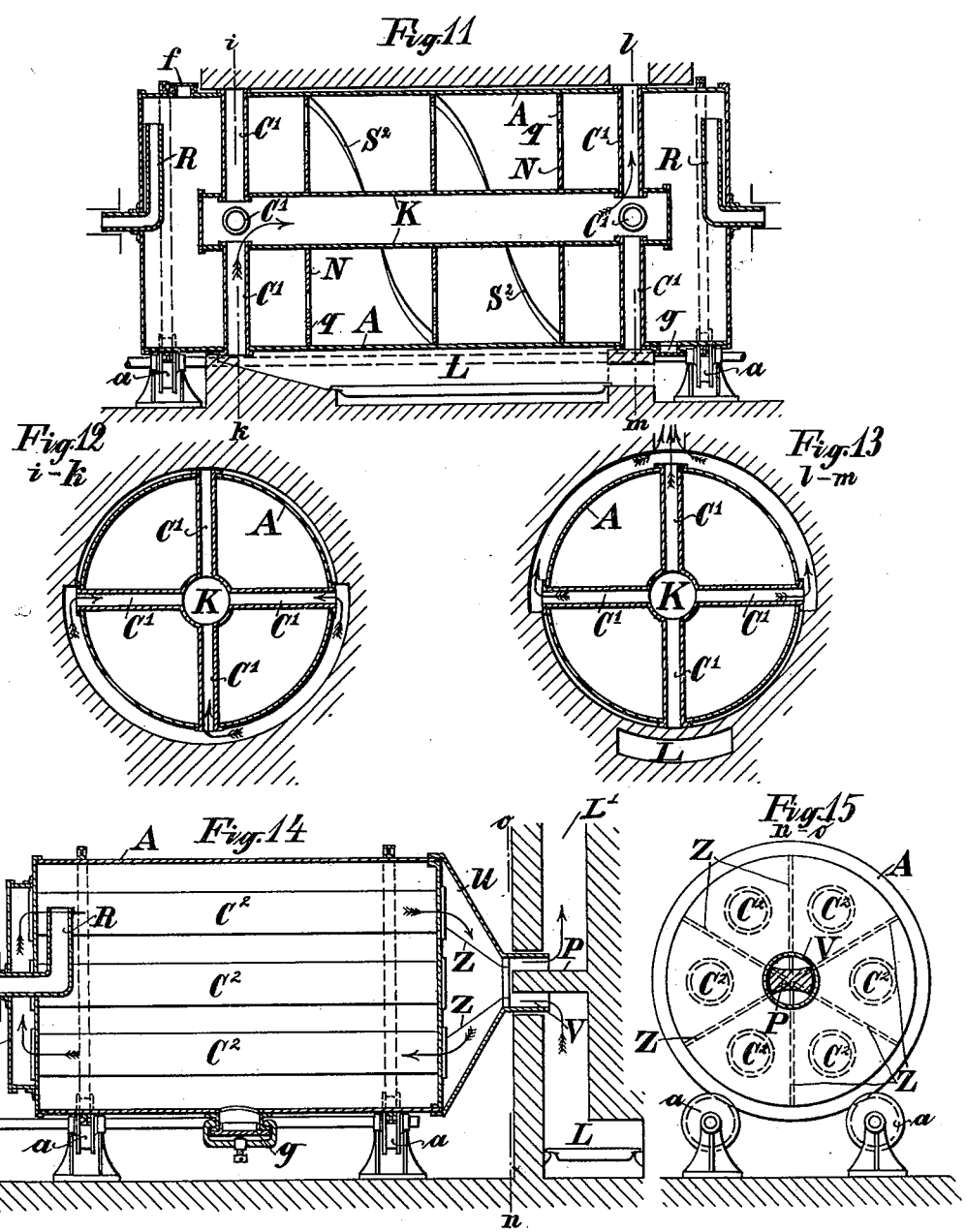

UNITED STATES PATENT OFFICE.

EDUARD LARSEN, OF COPENHAGEN, DENMARK.

APPARATUS FOR DRY DISTILLATION OF WOOD, COAL, &c.

SPECIFICATION forming part of Letters Patent No. 635,260, dated October 17, 1899.

Application filed January 19, 1899. Serial No. 702,684. (No model.)

*To all whom it may concern:*

Be it known that I, EDUARD LARSEN, engineer, of 12 Norrevoldgade, Copenhagen, in the Kingdom of Denmark, have invented improvements in apparatus for the dry distillation of wood, wood refuse, coal, peat, and the like and for the treatment of other substances; and I do hereby declare the nature of this invention and in what manner the same is to be performed to be particularly described and ascertained in and by the following statement, reference being had to the accompanying drawings and to the letters marked thereon.

My invention relates to apparatus for the dry distillation of wood and other substances, my object being to simplify and improve the construction and operation of the rotary retorts used in operations of this character and to secure an increased economy in practicing the process.

The invention consists in the novel features of construction and new combinations of parts hereinafter fully described and then particularly pointed out and defined in the claims following said description.

For the purposes of this specification reference is had to the accompanying drawings, in which—

Figure 1 is a longitudinal section of a distilling apparatus in which my invention is incorporated. Fig. 2 is a transverse section upon the line $a\,b$ in Fig. 1. Fig. 3 is a longitudinal section showing a modified construction. Fig. 4 is a detail section showing a modified form of perforated cages for the discharge of the products of distillation. Fig. 5 is a transverse section upon the line $c\,d$ in Fig. 3. Fig. 6 is a longitudinal section showing further modifications. Fig. 6ª is an enlarged detail of the valve shown in Fig. 6. Fig. 7 is a cross-section upon the line $e\,f$ in Fig. 6. Fig. 8 is a longitudinal section showing further changes of construction. Fig. 9 is a cross-section on the line $g\,h$ in Fig. 8. Fig. 10 is a cross-section showing retorts arranged in pairs for use alternately. Fig. 11 is a longitudinal section showing further modifications. Fig. 12 is a cross-section on the line $i\,k$ in Fig. 11. Fig. 13 is a cross-section on the line $l\,m$ in Fig. 11. Fig. 14 is a longitudinal section showing further modifications. Fig. 15 is a cross-section on the line $n\,o$ in Fig. 14.

In apparatus constructed in accordance with my invention the retorts are preferably of cylindrical form, though they may be spherical. I have shown the cylindrical form in the present instance, and, referring to Figs. 1 and 2 of the accompanying drawings, the reference-letter A indicates a rotary retort arranged on rollers $a$ and provided with a double heating pipe or flue K B in such a manner that the products of combustion from the furnace L first traverse the outer tube or flue B in order to subsequently enter the inner tube or flue K, as indicated by the arrows in Fig. 1, and then escape into the chimney L'. Vanes or stirrers $b$ are provided for the purpose of acting on and further loosening the material during the rotation of the retort. These vanes are mounted upon radial arms $b'$, having their ends secured to the cylindrical wall of the retort and to the outer pipe B.

Through the front wall of the retort A an outlet-pipe R for the distillation products is tightly inserted in such a manner as not to partake of the rotary movement of the retort and so that its mouth is always turned upward or toward the upper part of the retort, as shown in Figs. 1 and 2, which for the time being is free from material.

A right and left hand screw conveyer S, passing through stuffing-boxes $a'$ and provided with a crank-handle $e$, serves for discharging the carbonized material at a central opening $g$ after the operation is finished and the retort stopped.

According to the arrangement shown in Figs. 3, 4, and 5 a group of heating-pipes C is arranged regularly around the central flue K, which serves for the discharge of the heating-gases. The said gases coming from the furnace L first pass into these heating-pipes, after which they meet in the central tube or flue K and subsequently escape into the chimney.

In the arrangement shown in Figs. 3 and 5 the discharge of the products of distillation is not effected by means of a stationary outlet-pipe, but by a collecting-chamber $d$ in communication with the interior of the retort by a sieve-like or perforated wall $d'$.

In the arrangement shown in Fig. 4 the discharge of the products of distillation instead of taking place through a perforated wall takes place through tubular perforated cages E, which at the same time establish communication between the collecting-chamber d and the interior of the retort. In order to prevent the perforations of the cages E becoming obstructed by material, steel-wire brushes e, Fig. 4, are provided and are adapted to be actuated when required from outside. The method of discharging the products of distillation, as illustrated in Figs. 3, 4, and 5, is preferred when treating comparatively coarse material.

In Figs. 6 and 7 a retort is shown in which there is also a central tube or flue K to receive the heating-gases from a surrounding set of tubes C and to carry them off into the chimney. In this arrangement the discharge of the products of distillation is effected by means of radiating pipes or conduits G, which terminate at the periphery of the retort near one of its ends, where they open into its interior and are furnished with suitable valves. These valves are kept closed by the action of a spring $f'$ or the like until they reach the upper part of their circular movement, when they strike against a stationary segmental piece O, by which they are opened and kept so until the retort has turned to such an extent that the material again gradually commences to cover the valve. The products of distillation passing out through the tubes C enter a collector H and thence escape by the pipe R.

Figs. 8 and 9 represent a retort varying from the preceding in that instead of the heating-pipes traversing the same axially diametrically-arranged heating-pipes C' are employed. The gases coming from the furnace L traverse these heating pipes or flues in various directions and then collect in their upper part and pass into the chimney L'.

Fig. 10 represents in cross-section a pair of retorts which admit of being alternately employed for drying and carbonizing. The furnace L is here arranged between the retorts in such a manner that on suitable dampers $m\ n$ being properly adjusted the fire-gases are first utilized for heating one retort and then subsequently serve for the preliminary drying of the contents of the second retort. If, for example, the carbonization has been completed in retort A', (which, according to the position of the dampers shown in Fig. 10, is heated first,) the dampers $m$ and $n$ are reversed, and while A' is being discharged the carbonization of the contents of A² is completed, whereupon the contents of the newly-charged retort A' can be subjected to a preliminary drying.

Figs. 11, 12, and 13 represent another arrangement suitable for a continuous carbonizing operation. The retort in this case is considerably longer than the other retorts previously illustrated and is provided with diaphragms N and with screw conveyers S², arranged between them. The diaphragms are themselves provided with openings $q$, through which the material gradually passes from one end to the other. The furnace is located near the discharge-opening $g$, so that the material is first dried in the left portion of the retort and is then during the rotation carried gradually by the screw conveyers through the openings of the diaphragms to the right, where the final carbonization takes place. The rotation of the retort is then stopped and the carbonized material is drawn from the farthest right-hand chamber N through the discharge-opening, while upon the left at $f$ fresh material is admitted. In this arrangement the fire-gases pass through diametrically-arranged pipes C', terminating in a central collecting channel or flue K, whence they pass off into the chimney.

In Figs. 14 and 15 a still further arrangement is illustrated in which a group of heating-pipes $C^2$ is circularly arranged around the axis of the retort, and the retort is heated only by means of these pipes. The end of the retort next to the furnace is provided with a conical cover or cap U, furnished with a radial diaphragm Z and terminating in a cylindrical neck V, which is located in the wall of the furnace-flue. Into this neck projects a tongue or baffle P of masonry, so that the gases coming from the furnace L are forced to pass through the lower heating-pipes $C^2$, the front collecting-box $C^3$, and the upper heating pipes or flues $C^2$, and are thus compelled to traverse a given path through the retort prior to being discharged therefrom.

Having now particularly described and ascertained the nature of my said invention and in what manner the same is to be performed, I declare that what I claim is—

1. In an apparatus for the dry distillation of wood, the combination with a cylindrical retort capable of rotation, of a central interior flue extending longitudinally and terminating at the outer end within the retort, flues communicating with the central flue, a furnace discharging its hot gases into the outer flues, and a chimney receiving said gases from the central flue, all the outer flues having communication with the central flue at their end farthest from said furnace, substantially as described.

2. In an apparatus for the dry distillation of wood, the combination with a cylindrical retort capable of rotary movement, of a central flue, a series of interior outer flues extending longitudinally, of a furnace discharging its heated gases into the outer flues, a chimney receiving said gases from the central flue, and a common chamber at the end of the retort most remote from the furnace into which the ends of all the flues open, substantially as described.

3. In an apparatus for the dry distillation of wood, the combination with a cylindrical retort capable of rotary movement, of a central flue, a series of independent interior longitudinal flues, a heating-furnace near one end of the retort, a chimney near said end, an opening from the end of the retort to both furnace and chimney, and a chamber at the other end of the retort with which the ends of the flues all communicate, whereby the hot gases from the furnace enter the outer flues, and pass from the central flue to the chimney, and a chamber having communication with said chamber, substantially as described.

4. In an apparatus for the dry distillation of wood, the combination with a retort capable of rotary movement, of an interior series of horizontal flues, a central flue with which they all communicate, a furnace communicating with the outer flues at one end of the retort, a chimney receiving the hot gases from the central flue at the same end of the retort, and a chamber at the other end to receive the products of distillation, said chamber being separated from the retort by a perforated wall, substantially as described.

5. In an apparatus for the distillation of wood, the combination with a retort capable of rotary movement, of a series of inner horizontal flues, a central flue with which they communicate, a furnace communicating with the outer flues at one end of the retort, a chimney receiving the hot gases from the central flue at the same end of said retort, a chamber for the products of distillation at the other end, a series of perforated cages in the wall dividing said chamber from the retort, and rotary brushes in said cages, to clear the perforations, substantially as described.

In witness whereof I have hereunto set my hand in presence of two witnesses.

EDUARD LARSEN.

Witnesses:
  JULES BLOM,
  CAMINO BOËNUS.